UNITED STATES PATENT OFFICE.

LOUIS DUPARC AND CHARLES URFER, OF GENEVA, SWITZERLAND.

PROCESS FOR THE MANUFACTURE OF PEROXID OF NITROGEN.

1,366,773. Specification of Letters Patent. Patented Jan. 25, 1921.

No Drawing. Application filed September 24, 1919. Serial No. 325,958.

*To all whom it may concern:*

Be it known that we, LOUIS DUPARC and CHARLES URFER, citizens of Switzerland, residing at Geneva, Switzerland, in the Confederation of Switzerland, have invented certain new and useful Improvements in Processes for the Manufacture of Peroxid of Nitrogen, of which the following is a specification.

This invention relates to a process for the manufacture of peroxid of nitrogen and more particularly to a process in which the peroxid of nitrogen is obtained by the direct oxidation of ammonia preferably by means of catalyzers under the direct action of heat.

In carrying out the invention, we preferably pass an undried mixture of approximately four volumes of ammonia and seven volumes of oxygen rapidly over a catalyzer heated to a temperature varying between 500 and 650 degrees C., and then collect in water at a suitable temperature the peroxid of nitrogen thus obtained. As a catalyzer, we preferably employ a metal belonging to the platinum group and placed on asbestos in a finely divided state in which we find that best results can be obtained, and also we prefer the use of finely divided rhodium which appears to produce the best results.

Heretofore, in various experiments made with platinum or with asbestos containing the finely divided platinum or with asbestos containing finely divided rhodium, there have always resulted, owing to the incomplete oxidation of the ammonia, certain secondary products such, for example, as ammonium nitrate $NH_4NO_3$, ammonium nitrite $NH_4NO_2$ and the like in addition to the peroxid of nitrogen $NO_2$ so that the peroxid of nitrogen was not 100 per cent. pure and the nitric acid made from the same was correspondingly below 100 per cent. pure.

After many experiments, however, we have found that it is possible to effect a complete oxidation of the ammonia into peroxid of nitrogen by the use of pure oxygen in the manner hereinbefore named and in the ratio to the ammonia as hereinbefore stated in accordance with the equation $$4NH_3 + 7O_2 = 4NO_2 + 6H_2O.$$

We have also found that it is not possible to obtain this result by replacing the oxygen by air or by passing a current of oxygen into a solution of ammonia, but that the result, as stated, can invariably be obtained by freeing the ammonia by heating a concentrated solution thereof, and that the efficiency of the process depends entirely upon the fixing of the conditions under which the reactions take place, that is upon the proportions of the ammonia and oxygen employed, the temperature at which the reactions take place and the nature of the catalyzer as well as upon the humidity and velocity of the gas mixture. Thus by employing the ammonia and oxygen in definite proportions and in a humid state with a catalyzer of a particular kind and at a predetermined temperature it is possible to use a gas velocity sufficiently high to entirely prevent the formation of undesirable products such as the nitrates and nitrites to which we have hereinbefore referred and to obtain a yield of substantially 100 per cent. pure nitrogen peroxid.

In carrying out the process, therefore, in accordance with our present invention, we employ an undried mixture of four volumes of ammonia and seven volumes of pure oxygen and pass the same at a comparatively high speed over a catalyzer preferably comprising rhodium black or asbestos carrying a deposit of finely divided rhodium at a temperature between 500 and 650 degrees C. and preferably at approximately 590° centigrade, and in doing so, we obtain under these conditions a substantially 100 per cent. pure peroxid of nitrogen. This peroxid of nitrogen may then be directed into water maitnained at a temperature of approximately 30 degrees C. in which the peroxid of nitrogen is absorbed, thus forming nitric acid.

We claim as our invention:

1. The process of oxidizing ammonia consisting in passing an undried mixture of four volumes of ammonia and seven volumes of pure oxygen rapidly over a catalyzer comprising asbestos having thereon a deposit of rhodium at a temperature of between 500° and 650° centigrade.

2. The process of oxidizing ammonia consisting in passing an undried mixture of four volumes of ammonia and seven volumes of pure oxygen rapidly over a catalyzer comprising asbestos having thereon a deposit of finely divided rhodium heated to a temperature of approximately 590° centigrade.

In testimony whereof we affix our signatures in presence of two witnesses.

LOUIS DUPARC.
CHARLES URFER.

Witnesses:
Dr. Rod. de Wurstemberg,
W. Ymer.